US012750829B2

(12) United States Patent
Zhu et al.

(10) Patent No.: US 12,750,829 B2
(45) Date of Patent: Sep. 29, 2026

(54) PROVIDING A CARRIER CONFIGURATION TO MAXIMIZE A SPECTRUM RESOURCE

(71) Applicant: HUAWEI TECHNOLOGIES CO., LTD., Shenzhen (CN)

(72) Inventors: Hong Zhu, Shenzhen (CN); Zhou Xu, Madrid (ES); Liwen Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 18/431,229

(22) Filed: Feb. 2, 2024

(65) Prior Publication Data

US 2024/0172205 A1 May 23, 2024

Related U.S. Application Data

(63) Continuation of application No. PCT/CN2022/106712, filed on Jul. 20, 2022.

(30) Foreign Application Priority Data

Aug. 6, 2021 (CN) ........................ 202110900703.X

(51) Int. Cl.

*H04W 72/0453* (2023.01)
*H04W 72/0457* (2023.01)
*H04W 72/51* (2023.01)
*H04W 76/20* (2018.01)

(52) U.S. Cl.

CPC ... *H04W 72/0453* (2013.01); *H04W 72/0457* (2023.01); *H04W 72/51* (2023.01); *H04W 76/20* (2018.02)

(58) Field of Classification Search

CPC . H04W 72/0453; H04W 76/20; H04W 72/51; H04W 72/0457; H04W 8/24; H04W 72/23; H04L 5/001; H04L 5/0053; H04L 5/006; H04L 5/0098

See application file for complete search history.

(56) References Cited

U.S. PATENT DOCUMENTS

2013/0010716 A1* 1/2013 Dinan .................. H04W 76/15 370/329
2018/0192344 A1* 7/2018 Feng ..................... H04W 72/23
2020/0374908 A1* 11/2020 Zhu ....................... H04L 5/0098
2021/0352741 A1* 11/2021 Mo .................. H04W 74/0841
2021/0360616 A1* 11/2021 Yi ......................... H04L 5/0053
2023/0039103 A1* 2/2023 Khoshnevisan ...... H04W 52/54

* cited by examiner

*Primary Examiner* — Mewale A Ambaye
(74) *Attorney, Agent, or Firm* — Rimon PC

(57) ABSTRACT

This application provides a carrier configuration method and a communication apparatus. The method may include: a terminal device accesses a first cell by using a control channel resource of a first carrier. The terminal device receives first carrier configuration information in the first cell. The first carrier configuration information is used to change a carrier of the terminal device from the first carrier to a second carrier in the first cell. The first carrier and the second carrier share the control channel resource, and include different spectrum resources. According to this application, spectrum resource utilization of the first cell can be improved.

12 Claims, 6 Drawing Sheets

| | |
|---|---|
| TDD F1 100 MHz | F2 < 100 MHz |

(a)

| | |
|---|---|
| FDD F1 50 MHz | F2 < 50 MHz |

(b)

PROVIDING A CARRIER CONFIGURATION TO MAXIMIZE A SPECTRUM RESOURCE

CROSS-REFERENCE TO RELATED APPLICATIONS

This application is a continuation of International Application No. PCT/CN2022/106712, filed on Jul. 20, 2022, which claims priority to Chinese Patent Application No. 202110900703. X, filed on Aug. 6, 2021. The disclosures of the aforementioned applications are incorporated herein by reference in their entireties.

TECHNICAL FIELD

This application relates to the communication field, and more specifically, to a carrier configuration method and a communication apparatus.

BACKGROUND

A 3rd Generation Partnership Project (3GPP) standard defines a maximum bandwidth of a single carrier that can be supported by a terminal device. For example, for a 5th generation (5G) time division duplex (TDD) frequency range (FR) 1, a single carrier can support a maximum bandwidth of 100 MHz, and for 5G frequency division duplex (FDD), a single carrier can support a maximum bandwidth of 50 MHz. How to efficiently use a spectrum resource at a granularity of a carrier is an urgent problem to be resolved.

SUMMARY

This application provides a carrier configuration method, to maximize utilization of a spectrum resource.

According to a first aspect, a carrier configuration method is provided. The method includes: A terminal device accesses a first cell by using a control channel resource of a first carrier. The terminal device receives first carrier configuration information in the first cell. The first carrier configuration information is used to change a carrier of the terminal device from the first carrier to a second carrier in the first cell. The first carrier and the second carrier share the control channel resource, and include different spectrum resources.

It should be understood that the terminal device may access the first cell by using the control channel resource of the first carrier. This indicates that the terminal device has a capability of accessing the high-bandwidth cell.

Based on the foregoing technical solution, when the terminal device accesses the first cell, the terminal device can receive the first carrier configuration information from a network device, so that the terminal device changes the carrier to change a frequency domain resource used in the first cell. In this way, spectrum resource utilization of the first cell is improved. If the terminal device changes the carrier from the first carrier to the second carrier based on the first carrier configuration information, a transmission rate of the terminal device and a network throughput are further improved. For example, if a load of the first carrier is higher and a load of the second carrier is lower, after the terminal device changes the carrier from the first carrier to the second carrier, the transmission rate can be improved.

In addition, when the first carrier and the second carrier share the control channel resource, system overheads can further be reduced.

With reference to the first aspect, in some implementations of the first aspect, the method further includes: The terminal device changes from the first carrier to the second carrier based on the first carrier configuration information.

It should be understood that the terminal device may change from the first carrier to the second carrier based on the first carrier configuration information. This indicates that the terminal device has a capability of parsing the first carrier configuration information, and a capability of changing from the first carrier to the second carrier based on the first carrier configuration information.

With reference to the first aspect, in some implementations of the first aspect, the method further includes: The terminal device reports first capability information in the first cell. The first capability information indicates that the terminal device supports the change from the first carrier to the second carrier.

With reference to the first aspect, in some implementations of the first aspect, the method further includes: The terminal device receives bandwidth part (BWP) configuration information. The BWP configuration information is used to configure a BWP of the second carrier, and a start location of the BWP is determined based on a start location of the second carrier.

With reference to the first aspect, in some implementations of the first aspect, the first carrier and the second carrier further include a same spectrum resource, and the same spectrum resource includes a data channel resource and/or a measurement channel resource.

For example, the first carrier and the second carrier may share the same spectrum resource in a manner of space division multiplexing, time division multiplexing, frequency division multiplexing, or code division multiplexing.

Based on the foregoing technical solution, the first carrier and the second carrier share the same spectrum resource, so that a system capacity of the first cell can be increased.

According to a second aspect, a communication method is provided. The method includes: A terminal device accesses a first cell by using a control channel resource of a second carrier. The terminal device receives second carrier configuration information in the first cell. The second carrier configuration information is used to add a fourth carrier for the terminal device in the first cell. The terminal device communicates with a network device in the first cell by using the second carrier and the fourth carrier. The second carrier and the fourth carrier include completely different spectrum resources.

Based on the foregoing technical solution, when the terminal device accesses the first cell by using the second carrier, the terminal device may receive the second carrier configuration information from the network device, so that the terminal device can add the fourth carrier based on the second carrier configuration information. In this way, carrier aggregation configuration of two carriers is implemented in the first cell, resource utilization and throughput of the first cell are improved, and the experience of the terminal device is improved.

With reference to the second aspect, in some implementations of the second aspect, the method further includes: The terminal device reports second capability information in the first cell. The second capability information indicates that the terminal device supports carrier aggregation.

With reference to the second aspect, in some implementations of the second aspect, the method further includes: The terminal device uses synchronization with the second carrier to keep synchronization with the fourth carrier.

According to a third aspect, a carrier configuration method is provided. The method includes: A terminal device accesses a first cell by using a control channel resource of a first carrier. The terminal device reports first capability information in the first cell. The first capability information indicates that the terminal device supports the change from the first carrier to a second carrier. The first carrier and the second carrier share the control channel resource, and include different spectrum resources.

Based on the foregoing technical solution, when the terminal device accesses the first cell, the terminal device reports the first capability information, so that a network device may send, to the terminal device based on the first capability information of the terminal device, carrier configuration information used to change a carrier of the terminal device.

In addition, when the first carrier and the second carrier share the control channel resource, system overheads can further be reduced.

With reference to the third aspect, in some implementations of the third aspect, the method further includes: The terminal device receives first carrier configuration information in the first cell. The first carrier configuration information is used to change the carrier of the terminal device from the first carrier to the second carrier in the first cell. The terminal device changes from the first carrier to the second carrier based on the first carrier configuration information.

It should be understood that the terminal device may change from the first carrier to the second carrier based on the first carrier configuration information. This indicates that the terminal device has a capability of parsing the first carrier configuration information, and a capability of changing from the first carrier to the second carrier based on the first carrier configuration information.

Based on the foregoing technical solution, the terminal device receives the first carrier configuration information from the network device, so that the terminal device can change the carrier to change a frequency domain resource used in the first cell. In this way, spectrum resource utilization of the first cell is improved. When the terminal device changes the carrier from the first carrier to the second carrier based on the first carrier configuration information, a transmission rate of the terminal device and a network throughput are further improved. For example, if a load of the first carrier is higher and a load of the second carrier is lower, after the terminal device changes the carrier from the first carrier to the second carrier, the transmission rate can be improved.

With reference to the third aspect, in some implementations of the third aspect, the method further includes: The terminal device receives BWP configuration information. The BWP configuration information is used to configure a BWP of the second carrier, and a start location of the BWP is determined based on a start location of the second carrier.

With reference to the third aspect, in some implementations of the third aspect, the first carrier and the second carrier further include a same spectrum resource, and the same spectrum resource includes a data channel resource and/or a measurement channel resource.

For example, the first carrier and the second carrier may share the same spectrum resource in a manner of space division multiplexing, time division multiplexing, frequency division multiplexing, or code division multiplexing.

Based on the foregoing technical solution, the first carrier and the second carrier share the same spectrum resource, so that a system capacity of the first cell can be increased.

According to a fourth aspect, a carrier configuration method is provided. The method may include: A network device determines first carrier configuration information. The first carrier configuration information is used to change a carrier of a first terminal device from a first carrier to a second carrier in a first cell. The first terminal device is a terminal device that accesses the first cell by using a control channel resource of the first carrier. The first carrier and the second carrier share the control channel resource, and include different spectrum resources. The network device sends the first carrier configuration information to the first terminal device.

Based on the foregoing technical solution, when the terminal device accesses the first cell, the terminal device can receive the first carrier configuration information from a network device, so that the terminal device changes the carrier to change a frequency domain resource used in the first cell. In this way, spectrum resource utilization of the first cell is improved. If the terminal device changes the carrier from the first carrier to the second carrier based on the first carrier configuration information, a transmission rate of the terminal device and a network throughput are further improved. For example, if a load of the first carrier is higher and a load of the second carrier is lower, after the terminal device changes the carrier from the first carrier to the second carrier, the transmission rate can be improved. In addition, when the first carrier and the second carrier share the control channel resource, system overheads can further be reduced.

With reference to the fourth aspect, in some implementations of the fourth aspect, the method further includes: The network device receives first capability information in the first cell. The first capability information indicates that the first terminal device supports the change from the first carrier to the second carrier.

With reference to the fourth aspect, in some implementations of the fourth aspect, the method further includes: The network device sends BWP configuration information to the first terminal device. The BWP configuration information is used to configure a BWP of the second carrier, and a start location of the BWP is determined based on a start location of the second carrier.

With reference to the fourth aspect, in some implementations of the fourth aspect, that a network device determines first carrier configuration information includes: The network device determines carrier configuration information based on one or more of the following: a frequency band interference value of the first cell, a physical resource block utilization rate of the first cell, a quantity of terminal devices in a radio resource control connected mode in the first cell, and a service type of the terminal device in the radio resource control connected mode.

With reference to the fourth aspect, in some implementations of the fourth aspect, the method further includes: The network device performs space division pairing between a second terminal device that meets a pairing condition and the first terminal device. The second terminal device uses a third carrier in the first cell. The third carrier and the second carrier share the control channel resource, and include a same spectrum resource.

Based on the foregoing technical solution, the network device may perform space division configuration on terminal devices that use different carriers. In this way, a system capacity of the first cell can be increased.

With reference to the fourth aspect, in some implementations of the fourth aspect, the first carrier and the second carrier further include a same spectrum resource, and the same spectrum resource includes a data channel resource and/or a measurement channel resource.

For example, the first carrier and the second carrier may share the same spectrum resource in a manner of space division multiplexing, time division multiplexing, frequency division multiplexing, or code division multiplexing.

Based on the foregoing technical solution, the first carrier and the second carrier share the same spectrum resource, so that the system capacity of the first cell can be increased.

According to a fifth aspect, a carrier configuration method is provided. The method includes: A network device determines second carrier configuration information. The second carrier configuration information is used to add a fourth carrier for a first terminal device in a first cell. The first terminal device is a terminal device that accesses the first cell by using a control channel resource of the second carrier. The second carrier and the fourth carrier include completely different spectrum resources. The network device sends the second carrier configuration information to the first terminal device.

Based on the foregoing technical solution, when the terminal device accesses the first cell by using the first carrier, the network device may send the second carrier configuration information to the terminal device, so that the terminal device can add the fourth carrier based on the second carrier configuration information. In this way, carrier aggregation configuration of two carriers is implemented in the first cell, resource utilization and a throughput of the first cell are improved, and the experience of the first terminal device is improved.

With reference to the fifth aspect, in some implementations of the fifth aspect, the method further includes: The network device receives second capability information in the first cell. The second capability information indicates that the first terminal device supports carrier aggregation.

With reference to the fifth aspect, in some implementations of the fifth aspect, the method further includes: The network device performs space division pairing between a second terminal device that meets a pairing condition and the first terminal device. The second terminal device uses a third carrier in the first cell. The third carrier and the second carrier share the control channel resource, and include a same spectrum resource.

Based on the foregoing technical solution, the network device may perform space division configuration on terminal devices that use different carriers. In this way, a system capacity of the first cell can be increased.

According to a sixth aspect, a carrier configuration method is provided. The method includes: A network device receives first capability information in a first cell. The first capability information indicates that first terminal device supports changing from a first carrier to a second carrier. The network device determines first carrier configuration information based on the first capability information. The first carrier configuration information is used to change a carrier of the first terminal device from the first carrier to the second carrier in the first cell. The first terminal device is a terminal device that accesses the first cell by using a control channel resource of the first carrier. The first carrier and the second carrier share the control channel resource, and include different spectrum resources. The network device sends the first carrier configuration information to the first terminal device.

Based on the foregoing technical solution, when the terminal device accesses the first cell, the terminal device reports the first capability information, so that the network device may send the first carrier configuration information to the terminal device based on the first capability information of the terminal device. Correspondingly, the terminal device receives the first carrier configuration information from the network device, so that the terminal device can change the carrier to change a frequency domain resource used in the first cell. In this way, spectrum resource utilization of the first cell is improved. When the terminal device changes the carrier from the first carrier to the second carrier based on the first carrier configuration information, a transmission rate of the terminal device and a network throughput are further improved. For example, if a load of the first carrier is higher and a load of the second carrier is lower, after the terminal device changes the carrier from the first carrier to the second carrier, the transmission rate can be improved.

In addition, when the first carrier and the second carrier share the control channel resource, system overheads can further be reduced.

With reference to the sixth aspect, in some implementations of the sixth aspect, the method further includes: The network device sends BWP configuration information to the first terminal device. The BWP configuration information is used to configure a BWP of the second carrier, and a start location of the BWP is determined based on a start location of the second carrier.

With reference to the sixth aspect, in some implementations of the sixth aspect, that a network device determines first carrier configuration information includes: The network device determines carrier configuration information based on one or more of the following: a frequency band interference value of the first cell, a physical resource block utilization rate of the first cell, a quantity of terminal devices in a radio resource control connected mode in the first cell, and a service type of the terminal device in the radio resource control connected mode.

With reference to the sixth aspect, in some implementations of the sixth aspect, the method further includes: The network device performs space division pairing between a second terminal device that meets a pairing condition and the first terminal device. The second terminal device uses a third carrier in the first cell. The third carrier and the second carrier share the control channel resource, and include a same spectrum resource.

Based on the foregoing technical solution, the network device may perform space division configuration on terminal devices that use different carriers. In this way, a system capacity of the first cell can be increased.

With reference to the sixth aspect, in some implementations of the sixth aspect, the first carrier and the second carrier further include a same spectrum resource, and the same spectrum resource includes a data channel resource and/or a measurement channel resource.

For example, the first carrier and the second carrier may share the same spectrum resource in a manner of space division multiplexing, time division multiplexing, frequency division multiplexing, or code division multiplexing.

Based on the foregoing technical solution, the first carrier and the second carrier share the same spectrum resource, so that the system capacity of the first cell can be increased.

According to a seventh aspect, a communication apparatus is provided, including a unit configured to perform steps of the method according to any one of the first aspect or the implementations of the first aspect.

According to an eighth aspect, a communication apparatus is provided. The communication apparatus includes a processing unit and a transceiver unit. The processing unit is configured to access a first cell by using a control channel resource of a second carrier. The transceiver unit is configured to receive second carrier configuration information in the first cell. The second carrier configuration information is used to add a fourth carrier for the communication apparatus in the first cell. The transceiver unit is further configured to communicate with a network device in the first cell by using the second carrier and the fourth carrier. The second carrier and the fourth carrier include completely different spectrum resources.

With reference to the eighth aspect, in some implementations of the eighth aspect, the transceiver unit is further configured to report second capability information in the first cell. The second capability information indicates that the communication apparatus supports carrier aggregation.

With reference to the eighth aspect, in some implementations of the eighth aspect, the processing unit is further configured to use synchronization with the second carrier to keep synchronization with the fourth carrier.

According to a ninth aspect, a communication apparatus is provided. The communication apparatus includes a processing unit and a transceiver unit. The processing unit is configured to access a first cell by using a control channel of a first carrier. The transceiver unit is configured to report first capability information in the first cell. The first capability information indicates that the communication apparatus supports the change from the first carrier to a second carrier. The first carrier and the second carrier share the control channel resource, and include different spectrum resources.

With reference to the ninth aspect, in some implementations of the ninth aspect, the transceiver unit is further configured to receive first carrier configuration information in the first cell. The first carrier configuration information is used to change a carrier of the communication apparatus from the first carrier to a second carrier in the first cell. The processing unit is further configured to change from the first carrier to the second carrier based on the carrier configuration information.

With reference to the ninth aspect, in some implementations of the ninth aspect, the transceiver unit is further configured to receive BWP configuration information. The BWP configuration information is used to configure a BWP of the second carrier, and a start location of the BWP is determined based on a start location of the second carrier.

With reference to the ninth aspect, in some implementations of the ninth aspect, the first carrier and the second carrier further include a same spectrum resource, and the same spectrum resource includes a data channel resource and/or a measurement channel resource.

For example, the first carrier and the second carrier may share the same spectrum resource in a manner of space division multiplexing, time division multiplexing, frequency division multiplexing, or code division multiplexing.

According to a tenth aspect, a communication apparatus is provided, including a unit configured to perform steps of the method according to any one of the fourth aspect or the implementations of the fourth aspect.

According to an eleventh aspect, a communication apparatus is provided. The communication apparatus includes a processing unit and a transceiver unit. The processing unit is configured to determine second carrier configuration information. The second carrier configuration information is used to add a fourth carrier for a first terminal device in a first cell. The first terminal device is a terminal device that accesses the first cell by using a control channel resource of a second carrier. The second carrier and the fourth carrier include completely different spectrum resources. The transceiver unit is configured to send the second carrier configuration information to the first terminal device.

With reference to the eleventh aspect, in some implementations of the eleventh aspect, the transceiver unit is further configured to receive second capability information in the first cell. The second capability information indicates that the first terminal device supports carrier aggregation.

With reference to the eleventh aspect, in some implementations of the eleventh aspect, the processing unit is further configured to perform space division pairing between a second terminal device that meets a pairing condition and the first terminal device. The second terminal device uses a third carrier in the first cell. The third carrier and the second carrier share the control channel resource, and include a same spectrum resource.

According to a twelfth aspect, a communication apparatus is provided. The communication apparatus includes a processing unit and a transceiver unit. The transceiver unit is configured to receive first capability information in a first cell. The first capability information indicates that first terminal device supports changing from a first carrier to a second carrier. The processing unit is configured to determine first carrier configuration information based on the first capability information. The first carrier configuration information is used to change a carrier of the first terminal device from the first carrier to the second carrier in the first cell. The first terminal device is a terminal device that accesses the first cell by using a control channel resource of the first carrier. The first carrier and the second carrier share the control channel resource, and include different spectrum resources. The transceiver unit is further configured to send the first carrier configuration information to the first terminal device.

With reference to the twelfth aspect, in some implementations of the twelfth aspect, the transceiver unit is further configured to send BWP configuration information to the first terminal device. The BWP configuration information is used to configure a BWP of the second carrier, and a start location of the BWP is determined based on a start location of the second carrier.

With reference to the twelfth aspect, in some implementations of the twelfth aspect, the processing unit is specifically configured to determine the first carrier configuration information based on one or more of the following: a frequency band interference value of the first cell, a physical resource block utilization rate of the first width cell, a quantity of terminal devices in a radio resource control connected mode in the first cell, and a service type of the terminal device in the radio resource control connected mode.

With reference to the twelfth aspect, in some implementations of the twelfth aspect, the processing unit is further configured to perform space division pairing between a second terminal device that meets a pairing condition and the first terminal device. The second terminal device uses a third carrier in the first cell. The third carrier and the second carrier share the control channel resource, and include a same spectrum resource.

With reference to the twelfth aspect, in some implementations of the twelfth aspect, the first carrier and the second carrier further include a same spectrum resource, and the same spectrum resource includes a data channel resource and/or a measurement channel resource.

For example, the first carrier and the second carrier may share the same spectrum resource in a manner of space division multiplexing, time division multiplexing, frequency division multiplexing, or code division multiplexing.

According to a thirteenth aspect, a communication device is provided, including at least one processor. The at least one processor is coupled to at least one memory. The at least one memory is configured to store a computer program or instructions, and the at least one processor is configured to invoke and run the computer program or instructions from the at least one memory, so that the communication device performs the method according to any one of the first aspect to the third aspect or the possible implementations of the first aspect to the third aspect.

In an example, the communication apparatus may be a terminal device.

In another example, the communication apparatus may be a component (for example, a chip or an integrated circuit) installed in a terminal device.

According to a fourteenth aspect, a communication device is provided, including at least one processor. The at least one processor is coupled to at least one memory. The at least one memory is configured to store a computer program or instructions, and the at least one processor is configured to invoke and run the computer program or instructions from the at least one memory, so that the communication device performs the method according to any one of the fourth aspect to the sixth aspect or the possible implementations of the fourth aspect to the sixth aspect.

In an example, the communication apparatus may be a network device.

In another example, the communication apparatus may be a component (for example, a chip or an integrated circuit) installed in a network device.

According to a fifteenth aspect, a processor is provided. The processor includes an input circuit, an output circuit, and a processing circuit. The processing circuit is configured to receive a signal through the input circuit, and send a signal through the output circuit, so that the method according to any one of the first aspect to the sixth aspect or the possible implementations of the first aspect to the sixth aspect is implemented.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a sixteenth aspect, this application provides a computer-readable storage medium. The computer-readable storage medium stores computer instructions. When the computer instructions are run on a computer, the method according to any one of the first aspect to the sixth aspect or the possible implementations of the first aspect to the sixth aspect is performed.

According to a seventeenth aspect, this application provides a computer program product. The computer program product includes computer program code. When the computer program code is run on a computer, the method according to any one of the first aspect to the sixth aspect or the possible implementations of the first aspect to the sixth aspect is performed.

According to an eighteenth aspect, this application provides a chip, including a processor and a communication interface. The communication interface is configured to receive a signal, and transmit the signal to the processor, and the processor processes the signal, so that the method according to any one of the first aspect to the sixth aspect or the possible implementations of the first aspect to the sixth aspect is performed.

According to a nineteenth aspect, this application provides a communication system, including the foregoing terminal device and network device.

DESCRIPTION OF EMBODIMENTS

Figures 1, 2:
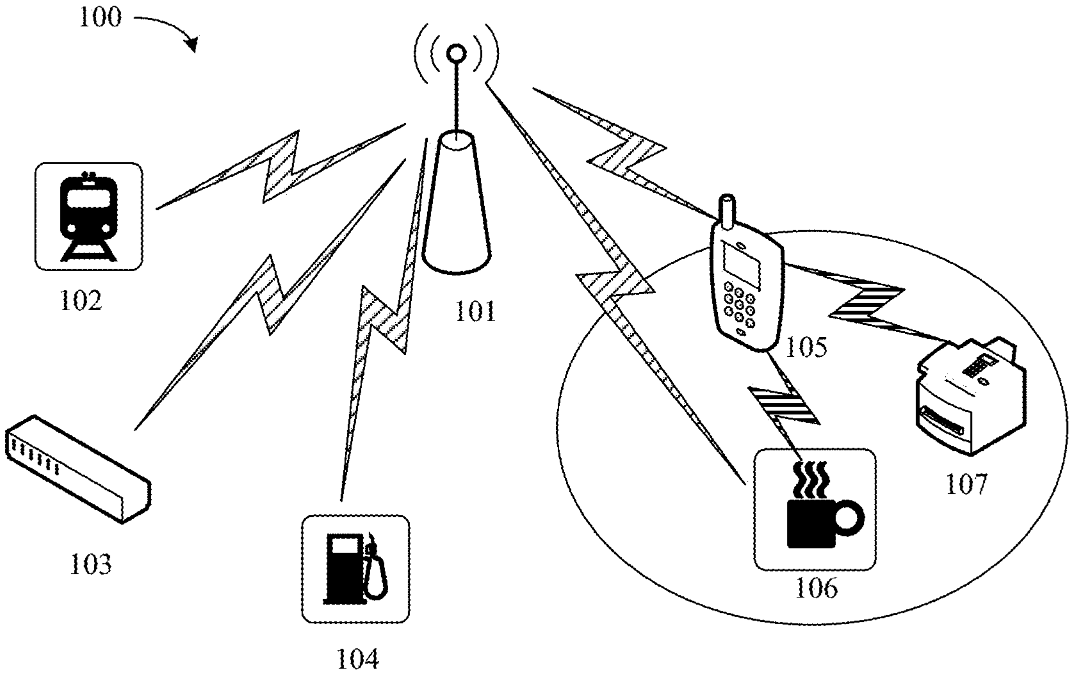
FIG. 1 is a schematic diagram of a communication system.
FIG. 2 is a schematic diagram of a non-peer-to-peer, continuous, and high-bandwidth spectrum.

The following describes technical solutions of this application with reference to accompanying drawings.

The technical solutions provided in this application may be applied to various communication systems, for example, a long term evolution (LTE) system, an LTE frequency division duplex (FDD) system, LTE time division duplex (TDD) system, a universal mobile telecommunications system (UMTS), a worldwide interoperability for microwave access (WiMAX) communication system, a 5th generation (5G) mobile communication system, or a new radio access technology (NR) system. The 5G mobile communication system may include non-standalone (NSA) and/or standalone (SA).

The technical solutions provided in this application may further be applied to machine type communication (MTC), a long term evolution-machine (LTE-M) technology, a device to device (D2D) network, a machine to machine (M2M) network, an internet of things (IoT) network, or another network. The IoT network may include, for example, an internet of vehicles. Communication modes in an internet of vehicles system are collectively referred to as vehicle to X (V2X, where X can stand for anything). For example, V2X may include vehicle-to-vehicle (V2V) communication, vehicle-to-infrastructure (V2I) communication, vehicle-to-pedestrian (V2P) communication, or vehicle-to-network (V2N) communication.

The technical solutions provided in this application may be further applied to a future communication system, for example, a 6th generation mobile communication system. This is not limited in this application.

In embodiments of this application, a network device may be any device with a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP) or a transmission and reception point (TRP), or the like. Alternatively, the device may be a gNB or a transmission point (TRP or TP) in a 5G system such as NR, or one or a group of antenna panels (including a plurality of antenna panels) of a base station in a 5G system. Alternatively, the device may be a network node constituting a gNB or a transmission point, such as a baseband unit (BBU) or a distributed unit (DU).

In some deployments, the gNB may include a central unit (CU) and a DU. The gNB may further include an active antenna unit (AAU). The CU implements some functions of the gNB, and the DU implements some functions of the gNB. For example, the CU is responsible for processing a non-real-time protocol and service and implementing functions of a radio resource control (RRC) layer and a packet data convergence protocol (PDCP) layer. The DU is responsible for processing a physical layer protocol and a real-time service and implementing functions of a radio link control (RLC) layer, a medium access control (MAC) layer, and a physical (PHY) layer. The AAU implements some physical layer processing functions, radio frequency processing, and a function related to an active antenna. Information at the RRC layer eventually becomes information at the PHY layer, or is converted from information at the PHY layer. Therefore, in the architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device provides a service for a cell, and terminal device communicates with the cell by using a transmission resource (for example, a frequency domain resource or a spectrum resource) configured by the network device. The cell may belong to a macro base station (for example, a macro eNB or a macro gNB), or may belong to a base station corresponding to a small cell. The small cell herein may include a metro cell, a micro cell, a pico cell, a femto cell, or the like. These small cells are characterized by a small coverage area and low transmit power, and are suitable for providing a high-rate data transmission service.

The terminal device in embodiments of this application may also be referred to as user equipment (UE), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device with a wireless connection function. Currently, some examples of the terminal may be a mobile phone, a tablet computer (pad), a computer (for example, a laptop or a palmtop computer) with a wireless transceiver function, a mobile internet device (MID), a virtual reality (VR) device, an augmented reality (AR) device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a cellular telephone, a cordless telephone, a session initiation protocol (SIP) telephone, a wireless local loop (WLL) station, a personal digital assistant (PDA), a handheld device with a wireless communication function, a computing device, another processing device connected to a wireless modem, a vehicle-mounted device, a wearable device, a terminal device in a 5G network, or a terminal device in a future evolved public land mobile network (PLMN).

The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that can be directly worn on the body or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may be a terminal device in an internet of things (IoT) system. IoT is an important part of future information technology development. A main technical feature of the IoT is to connect things to a network by using a communication technology, to implement an intelligent network in which man and a machine are connected and things are connected. In an IoT technology, massive connections, deep coverage, and power saving of a terminal may be implemented using, for example, a narrow band (NB) technology.

In addition, the terminal device may further include sensors such as an intelligent printer, a train detector, and a gas station. Main functions include collecting data (some terminal devices), receiving control information and downlink data of the network device, sending an electromagnetic wave, and transmitting uplink data to the network device.

For ease of understanding embodiments of this application, a communication system applicable to a method according to embodiments of this application is first described in detail with reference to FIG. 1. FIG. 1 is a schematic diagram of a communication system 100 applicable to the method according to embodiments of this application. As shown in the figure, the communication system 100 may include at least one network device, such as a network device 101 shown in FIG. 1. The communication system 100 may further include at least one terminal device, such as terminal devices 102 to 107 shown in FIG. 1. The terminal devices 102 to 107 may be mobile or fixed. The network device 101 may communicate with one or more of the terminal devices 102 to 107 over a radio link. Each network device may provide communication coverage for a specific geographical area, and may communicate with a terminal device located in the coverage area. For example, the network device may send configuration information to the terminal device, and the terminal device may send uplink data to the network device based on the configuration information. For another example, the network device may send downlink data to the terminal device.

Optionally, the terminal devices may directly communicate with each other. For example, the terminal devices may directly communicate with each other by using a D2D technology. As shown in the figure, terminal devices 105 and 106 and terminal devices 105 and 107 may directly communicate with each other by using the D2D technology. The terminal device 106 and the terminal device 107 may independently or simultaneously communicate with the terminal device 105.

Each of the terminal devices 105 to 107 may further communicate with the network device 101. For example, direct communication with the network device 101 may be implemented. For example, the terminal devices 105 and 106 in the figure may directly communicate with the network device 101. Alternatively, indirect communication with the network device 101 may be implemented. For example, the terminal device 107 in the figure communicates with the network device 101 through the terminal device 105.

It should be understood that FIG. 1 shows an example in which there is one network device, a plurality of terminal devices, and a communication link between communication devices. Optionally, the communication system 100 may include a plurality of network devices, and a coverage area of each network device may include another quantity of terminal devices, for example, more or fewer terminal devices. This is not limited in this application.

A plurality of antennas may be configured for each of the communication devices such as the network device 101 and the terminal devices 102 to 107 in FIG. 1. The plurality of antennas may include at least one transmit antenna configured to send a signal and at least one receive antenna configured to receive a signal. In addition, each communication device further includes a transmitter chain and a receiver chain. A person of ordinary skill in the art may understand that each communication device may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the wireless communication system 100 may further include other network entities such as a network controller and a mobility management entity. This is not limited in embodiments of this application.

A 3rd Generation Partnership Project (3GPP) standard defines a maximum bandwidth that is of a single carrier and that can be supported by the terminal device. For example, for a 5G TDD frequency range (FR) 1, a single carrier can support a maximum bandwidth of 100 MHz, and a single carrier of 5G FDD can support a maximum bandwidth of 50 MHz. Based on this, how to efficiently use a spectrum resource at a granularity of a carrier is an urgent problem to be resolved.

Currently, based on a maximum bandwidth that is supported by a single carrier and that is defined in the standard, when an operator can actually obtain a non-peer-to-peer high-bandwidth spectrum that exceeds a single-carrier bandwidth range, a high bandwidth carrier is generally configured as a plurality of carriers with bandwidths lower than an upper limit of a single-carrier bandwidth. A plurality of cells are configured, and combined into carrier aggregation (CA) based on a capability of the terminal device. The plurality of cells are independent of each other, and each cell is configured with a control channel and a data channel. In FIG. 2, (a) shows an example in which a TDD non-peer-to-peer continuous high bandwidth exceeds 100 MHZ, and (b) in FIG. 2 shows an example in which an FDD non-peer-to-peer continuous high bandwidth exceeds 50 MHz.

CA is a typical application technology for improving the user experience of high uplink and downlink rates in multi-carrier scenarios. In a CA solution, cells are classified into a primary cell (PCell) and a secondary cell (SCell) based on different camping. A cell accessed by a terminal device during initial connection establishment, a cell accessed by a terminal device during connection re-establishment, or a target cell accessed by a terminal device during handover is a PCell. The SCell refers to a cell configured by a base station for the terminal device by using RRC connection signaling. The SCell may provide more resources for a CA terminal device. For the SCell, there may be only downlink, or there may be uplink and downlink at the same time. In a data transmission phase, the PCell controls and decides to split data of the terminal device over a plurality of carriers.

Because terminal devices have different capabilities, a terminal device that does not support a CA capability can access only one carrier. Therefore, different users in a network may camp on different cells. Bandwidths of different cells are different, and a user who camps on a low-bandwidth cell has a poor experience. This affects a principle of user fairness in a mobile network. For a terminal device that supports the CA capability, although the PCell and the SCell are two different cells independent of each other, during data transmission, data carried in the SCell needs to be split and forwarded through the PCell. However, information and exchange frequency between the two cells are limited. There is usually a problem of improper splitting. Consequently, user experience in the CA does not reach an optimal effect.

In view of this, this application provides a carrier configuration method, to efficiently use a spectrum resource.

It should be understood that for ease of understanding and description, the method according to embodiments of this application is described below in detail by using an exchange between a terminal device and a network device as an example. However, this should constitute no limitation to an execution body of the method according to this application. For example, a terminal device shown in the following embodiments may be replaced with a component (for example, a chip or a chip system) configured in the terminal device. A network device shown in the following embodiments may also be replaced with a component (such as a chip or a chip system) configured in the network device.

A specific structure of the execution body of a method according to embodiments of this application is not specifically limited in the following embodiments, provided that a program that records code of the method according to embodiments of this application can be run to perform communication according to the method according to embodiments of this application. For example, the method according to embodiments of this application may be performed by the terminal device or the network device, or a functional module that can invoke and execute the program in the terminal device or the network device.

With reference to FIG. 3 to FIG. 8, the following describes in detail a resource configuration method according to an embodiment of this application.

Figure 3:
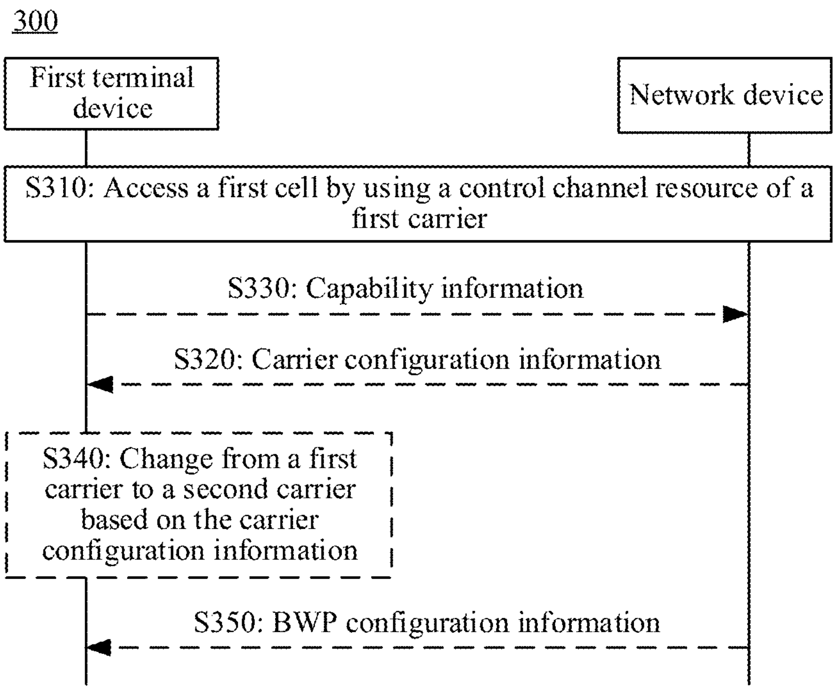
FIG. 3 is a schematic flowchart of a resource configuration method according to an embodiment of this application.

FIG. 3 is a schematic flowchart of a resource configuration method 300 according to an embodiment of this application. As shown in FIG. 3, the method 300 may include S310 to S350, and each step is described in detail below.

S310: A first terminal device accesses a first cell by using a control channel resource of a first carrier.

For example, the first terminal device searches for an SSB to obtain a master information block (MIB) message and a system information block (SIB) 1 message. Further, the first terminal device parses the MIB message and the SIB 1 message to obtain a configuration of the first carrier and a configuration of the control channel resource of the first carrier.

The configuration of the first carrier may include one or more of a start location of the first carrier, a bandwidth of the first carrier, and a subcarrier spacing of the first carrier.

The control channel resource of the first carrier includes one or more of the following: an SSB, a SIB message, a common physical downlink control channel (common PDCCH), a common physical uplink control channel (common PUCCH), an initial downlink (DL)/uplink (UL) BWP, and a physical random access channel (PRACH).

Further, the terminal device sends an access request message to a network device on the control channel resource of the first carrier. The access request message is used to request to access the first cell. For example, the terminal device sends the access request message to the network device on the initial UL BWP based on an initial DL/UL BWP configuration in the control channel resource of the first carrier. For example, a frequency domain location of the initial uplink/downlink BWP is the same as a location of a control resource set (CORESET) 0.

Correspondingly, the network device sends the access response message to the first terminal device based on the access request message. For example, if the terminal device receives the access response message from the network device, it may be considered that the terminal device successfully accesses the first cell.

A bandwidth of the first cell is not limited in this embodiment of this application.

In an example, the bandwidth of the first cell is higher than a maximum bandwidth supported by a single carrier. The maximum bandwidth supported by the single carrier may be a maximum bandwidth that is of the single carrier, that can be supported by the terminal device, and that is defined in a 3GPP standard. For example, for a single carrier of a 5G TDD FR 1, a maximum bandwidth of 100 MHz may be supported. If the first cell includes a TDD spectrum resource, a bandwidth of the TDD spectrum resource is higher than 100 MHz. For another example, for a single carrier of 5G FDD, a maximum bandwidth of 50 MHz may be supported. If the first cell includes an FDD spectrum resource, a bandwidth of the FDD spectrum resource is higher than 50 MHz. Optionally, a bandwidth of a spectrum resource included in the first cell is further lower than twice the maximum bandwidth supported by the single carrier. For example, a bandwidth of a TDD spectrum resource included in the first cell is higher than 100 MHz and lower than 200 MHz. For another example, a bandwidth of an FDD spectrum resource included in the first cell is higher than 50 MHz and lower than 100 MHz.

In another example, the bandwidth of the first cell is lower than or equal to the maximum bandwidth supported by the single carrier. For example, for the single carrier of the 5G TDD FR 1, the maximum bandwidth of 100 MHz may be supported. If the first cell includes the TDD spectrum resource, the bandwidth of the TDD spectrum resource is lower than or equal to 100 MHz. For another example, for the single carrier of 5G FDD, the maximum bandwidth of 50 MHz may be supported. If the first cell includes an FDD spectrum resource, the bandwidth of the FDD spectrum resource is lower than or equal to 50 MHz.

Continuity of the spectrum resource included in the first cell is not limited in this embodiment of this application. For example, the spectrum resource included in the first cell is a continuous spectrum resource, or the spectrum resource included in the first cell is a discontinuous spectrum resource.

Optionally, the MIB message and the SIB 1 message that are obtained by searching for the SSB by the first terminal device further include the bandwidth of the first cell. If the bandwidth of the first cell is higher than the maximum bandwidth supported by the single carrier, the first terminal device can send the access request message to the network device on the control channel resource of the first carrier. This indicates that the first terminal device has a capability of accessing the first cell. In other words, after the first terminal device obtains the bandwidth of the first cell by parsing the MIB message and the SIB 1 message, even if the bandwidth of the first cell exceeds the maximum bandwidth supported by the single carrier, the first terminal device may send the access request message to the network device on the control channel resource of the first carrier, to request to access the first cell.

Furthermore, a value relationship between the bandwidth of the first carrier and the bandwidth of the first cell is not limited in this embodiment of this application.

Figure 4:
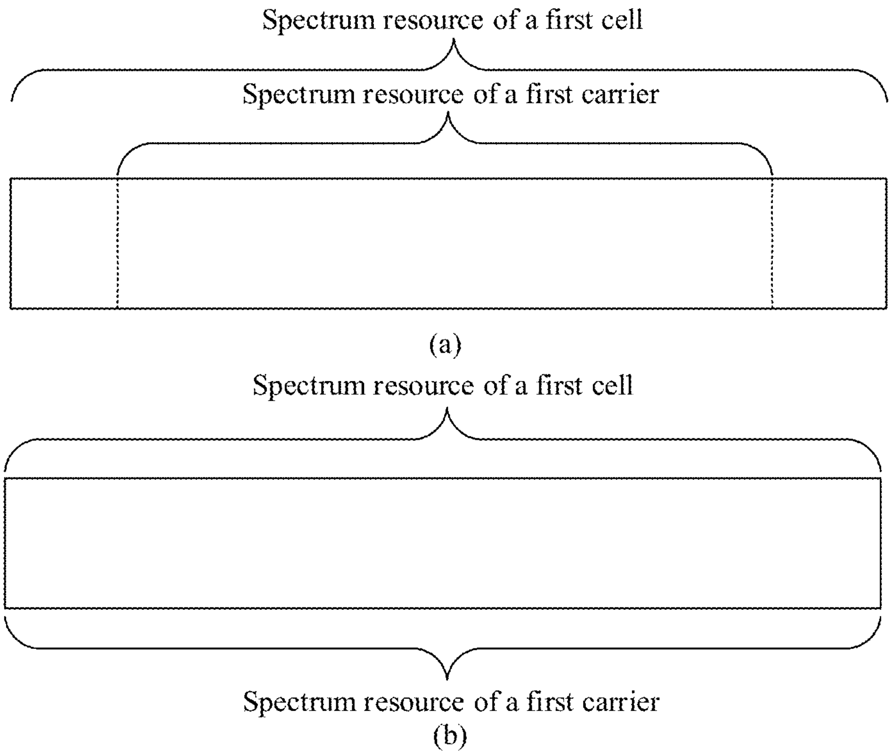
FIG. 4 is a schematic diagram of a relationship between a spectrum resource of a first cell and a spectrum resource of a first carrier.
Figure 5:
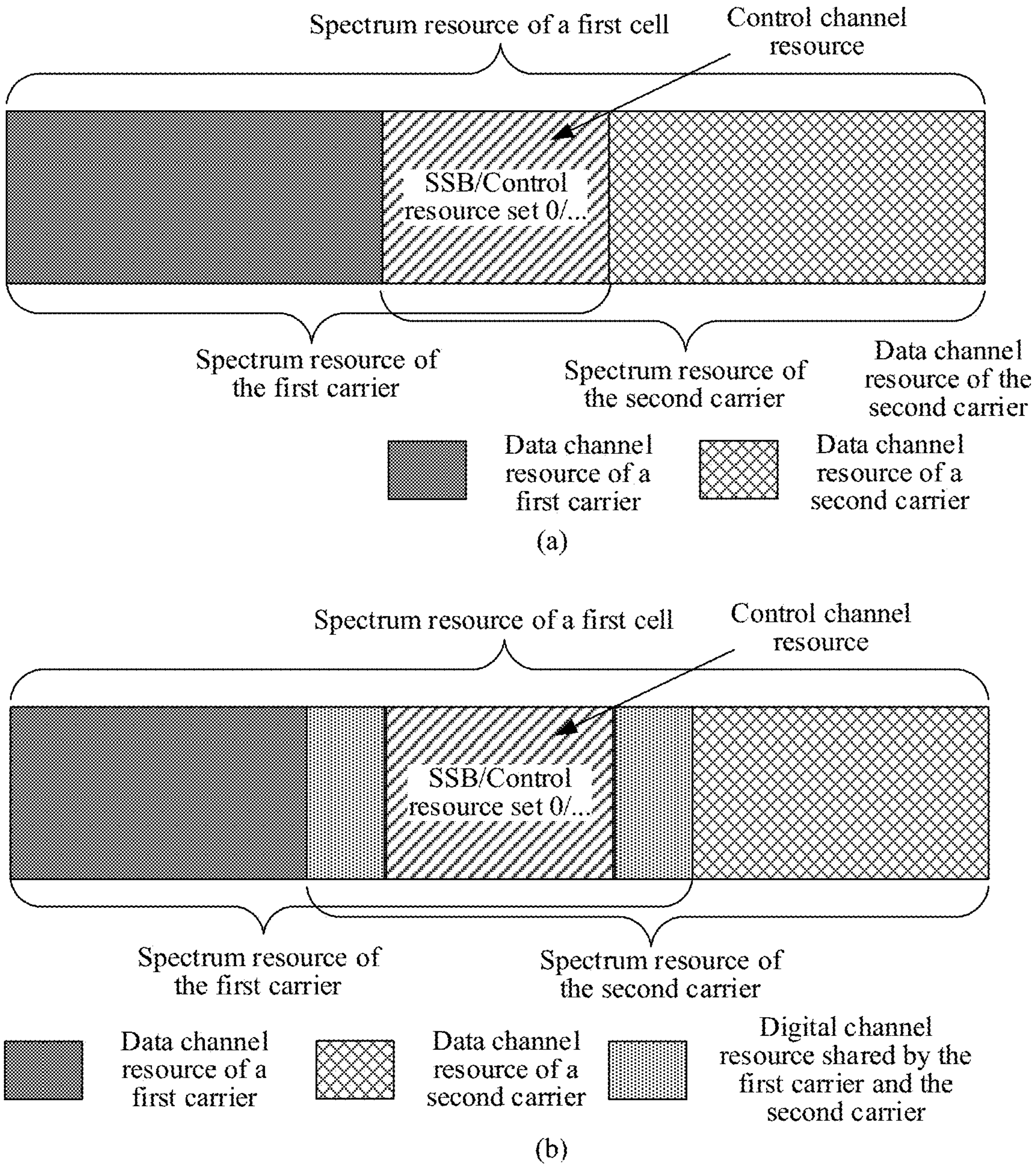
FIG. 5 is a schematic diagram of a relationship between a spectrum resource of a first carrier and a spectrum resource of a second carrier.

In an example, the bandwidth of the first carrier is lower than the bandwidth of the first cell. In other words, a spectrum resource of the first carrier is a part of the spectrum resource included in the first cell. It should be understood that when the bandwidth of the first carrier is lower than the bandwidth of the first cell, the bandwidth of the first cell is higher than or equal to the maximum bandwidth supported by the single carrier. For example, the first cell includes a TDD spectrum resource, the bandwidth of the first carrier is equal to 100 MHZ, and the bandwidth of the first cell is higher than 100 MHz. In FIG. 4, (a) shows an example in which the bandwidth of the first carrier is lower than the bandwidth of the first cell. As shown in (a) in FIG. 4, the spectrum resource of the first carrier is a part of the spectrum resource of the first cell. In other words, the bandwidth of the first carrier is lower than the bandwidth of the first cell.

In another example, the bandwidth of the first carrier is equal to the bandwidth of the first cell. In other words, the spectrum resource of the first carrier is the same as the spectrum resource included in the first cell. It should be understood that when the bandwidth of the first carrier is equal to the bandwidth of the first cell, the bandwidth of the first cell is lower than or equal to the maximum bandwidth supported by the single carrier. In FIG. 4, (b) shows an example in which the bandwidth of the first carrier is equal to the bandwidth of the first cell. As shown in (b) in FIG. 4, the spectrum resource of the first carrier is the same as the spectrum resource of the first cell. In other words, the bandwidth of the first carrier is equal to the bandwidth of the first cell.

Optionally, after the first terminal device successfully accesses the first cell by using the control channel resource of the first carrier, the method 300 further includes S320: The network device sends first carrier configuration information to the first terminal device. Correspondingly, in S320, the first terminal device receives the first carrier configuration information. The first carrier configuration information is used to change a carrier of the first terminal device from the first carrier to a second carrier in the first cell. The first carrier and the second carrier share the control channel resource of the first carrier, and include different spectrum resources.

For example, the first carrier configuration information is carried in an RRC reconfiguration message.

Similar to the foregoing descriptions of the value relationship between the bandwidth of the first carrier and the bandwidth of the first cell, a value relationship between a bandwidth of the second carrier and the bandwidth of the first cell is not limited in this embodiment of this application. In other words, the bandwidth of the second carrier may be equal to the bandwidth of the first cell, or may be lower than the bandwidth of the first cell.

In a possible implementation, that the first carrier and the second carrier include different spectrum resources means that the first carrier and the second carrier include completely different spectrum resources. It should be understood that the completely different spectrum resources included in the first carrier and the second carrier are spectrum resources other than the control channel resource. As shown in (a) in FIG. 5, in addition to the control channel resource shared by the first carrier and the second carrier, the first carrier and the second carrier include completely different data channel resources.

In another possible implementation, that the first carrier and the second carrier include different spectrum resources means that the first carrier and the second carrier include partially different spectrum resources. In other words, the first carrier and the second carrier further include partially a same spectrum resource. It should be understood that the partially same spectrum resource included in the first carrier and the second carrier is a spectrum resource other than the control channel resource. As shown in (b) in FIG. 5, in addition to the control channel resource shared by the first carrier and the second carrier, the first carrier and the second carrier further share a part of data channel resources.

For example, if the first carrier and the second carrier include the partially same spectrum resource, the first carrier and the second carrier may share a spectrum resource on an overlapping part of the second carrier and the third carrier in a manner of space division multiplexing, time division multiplexing, frequency division multiplexing, or code division multiplexing.

Bandwidths of the first carrier and the second carrier are not limited in this embodiment of this application. The bandwidth of the first carrier may be equal to the bandwidth of the second carrier, or the bandwidth of the first carrier may be unequal to the bandwidth of the second carrier.

The first carrier configuration information may include one or more of the following: information about a start location of the second carrier, a bandwidth of the second carrier, and a subcarrier spacing of the second carrier. The start location of the second carrier may be indicated using a quantity of RBs between a location of a start resource block (RB) of the second carrier and a location of a start point A. The quantity of RBs between the start RB location of the second carrier and pointA may be indicated using an offset (offsettocarrier).

Figure 6:
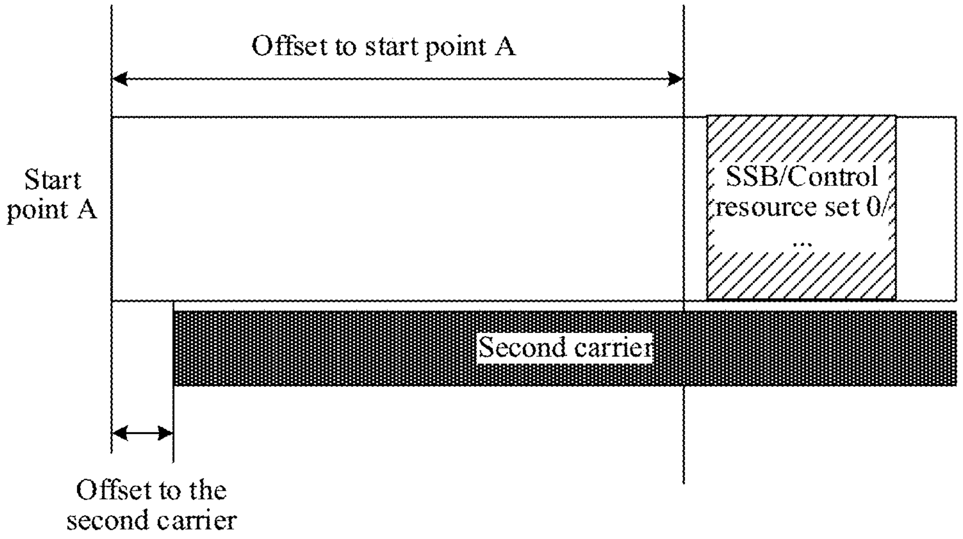
FIG. 6 is a schematic diagram of a synchronization signal block (SSB), a control resource set 0 (CORESET 0), and a carrier configuration.

For example, the first carrier configuration information includes offsettocarrier and the bandwidth of the second carrier. As shown in FIG. 6, during cell configuration, frequency domain locations of an SSB/a CORESET 0, pointA of a cell carrier, and a cell bandwidth length may be configured. An offset to the start point A (denoted as offsettopointA) is a quantity of offset RBs between pointA and the SSB. offsettopointA is used to determine a location of point A. After determining the location of point A, the first terminal device can determine a start frequency domain location of the second carrier based on offsettocarrier included in the first carrier configuration information, and can further determine a frequency domain location of the second carrier based on the bandwidth of the second carrier.

For another example, the first carrier configuration information includes offsettocarrier. For example, if the bandwidth of the second carrier is preconfigured for the first terminal device, the first carrier configuration information may not include the bandwidth of the second carrier. Correspondingly, the first terminal device determines the frequency domain location of the second carrier based on offsettocarrier and the preconfigured bandwidth of the second carrier. Alternatively, provided that the bandwidth of the second carrier is equal to the bandwidth of the first carrier by default, the first carrier configuration information may not include the bandwidth of the second carrier. Correspondingly, the first terminal device determines the frequency domain location of the second carrier based on offsettocarrier and the bandwidth of the first carrier.

For another example, the first carrier configuration information includes the bandwidth of the second carrier. For example, if the start location of the first carrier is the same as the start location of the second carrier by default, the first carrier configuration information may not include the start location information of the second carrier. Correspondingly, the first terminal device may determine the frequency domain location of the second carrier based on the bandwidth of the second carrier and the start location of the first carrier.

Optionally, in S320, the network device determines the first carrier configuration information based on one or more of the following: a frequency band interference value of the first cell, a physical resource block (PRB) utilization of the first width cell, a quantity of terminal devices in an RRC connected mode in the first cell, and a service type of the terminal device in the RRC connected mode. In other words, after the first terminal device accesses the first cell by using the control channel resource of the first carrier, the network device may determine, based on one or more of the foregoing items, whether to change the carrier of the first terminal device.

Optionally, before S320, the method 300 further includes S330: The first terminal device reports first capability information in the first cell. The first capability information indicates that the first terminal device supports the change from the first carrier to the second carrier. Correspondingly, in S330, the network device receives the first capability information from the first terminal device.

Specifically, in S330, the first terminal device reports the first capability information to the network device by using the first carrier.

Correspondingly, if the network device receives the first capability information from the first terminal device, the network device sends the first carrier configuration information to the first terminal device. In other words, the network device determines, based on the first capability information of the first terminal device, that the first terminal device supports the change from the first carrier to the second carrier, and then sends the first carrier configuration information to the terminal device.

For example, the first capability information may further indicate that the first terminal device supports access to a virtual high-bandwidth cell. A bandwidth of the virtual high-bandwidth cell is higher than the maximum bandwidth supported by a single carrier.

For another example, the first capability information may further indicate that the first terminal device supports parsing the first carrier configuration information.

For still another example, the first capability information further indicates that the first terminal device supports a flexible change of the spectrum resource used in the first cell.

Optionally, in S320, after the first terminal device receives the first carrier configuration information from the network device, if the first terminal device supports the change from the first carrier to the second carrier, the method 300 further includes S340: The first terminal device changes from the first carrier to the second carrier based on the first carrier configuration information.

It should be understood that, in S340, the first terminal device may change from the first carrier to the second carrier based on the first carrier configuration information. This indicates that the terminal device has a capability of parsing the first carrier configuration information and a capability of determining the second carrier based on the first carrier configuration information. An example in which the bandwidth of the first cell is higher than 100 MHz is used. For example, if the first carrier configuration information includes offsettocarrier, a value of offsettocarrier may be in a range of 0 to N−1, where N is a quantity of RBs corresponding to the bandwidth of the first cell, N>275, and N is a positive integer. In this case, the first terminal device has a capability of determining the start RB location of the second carrier based on offsettocarrier. Even if the value of offsettocarrier is greater than 274, the first terminal device may still determine the start RB location of the second carrier based on offsettocarrier.

That the first terminal device changes from the first carrier to the second carrier means that the first terminal device still maintains a connected mode with the first cell, but a spectrum resource used by the first terminal device to perform uplink and downlink data transmission with the network device by using the first cell is changed from the first carrier to the second carrier. In other words, in a process in which the first terminal device changes from the first carrier to the second carrier, the first terminal device does not access the first cell again by using the second carrier, but directly performs the uplink and downlink service transmission with the network device by using the spectrum resource of the second carrier.

It should be noted that, because spectrum resources of carriers used by the first terminal device before and after a carrier change are different, for ease of understanding and description, in this embodiment of this application, the carriers used by the first terminal device before and after the carrier change are respectively named the first carrier and the second carrier. Certainly, carriers used by the first terminal device before and after the carrier change may alternatively be considered as a same carrier (for example, denoted as the first carrier), and merely the spectrum resource of the first carrier used by the first terminal device changes based on carrier configuration information received from the network device. When the carriers used by the first terminal device before and after the carrier change are considered as a same carrier, it may be considered that the carrier configuration information received by the first terminal device from the network device is used to reconfigure the first carrier. In addition, a control channel resource of the first carrier before the reconfiguration and a control channel resource of the first carrier after the reconfiguration are the same, but include different spectrum resources.

In this embodiment of this application, after the first terminal device accesses the first cell by using the control channel resource of the first carrier, the first terminal device can receive the first carrier configuration information from the network device, so that the first terminal device changes the carrier to change a frequency domain resource used in the first cell. In this way, spectrum resource utilization of the first cell is improved. When the terminal device changes the carrier from the first carrier to the second carrier based on the first carrier configuration information, a transmission rate of the terminal device and a throughput are further improved. For example, if a load of the first carrier is higher and a load of the second carrier is lower, after the terminal device changes the carrier from the first carrier to the second carrier, the transmission rate can be improved.

Optionally, after the first terminal device changes from the first carrier to the second carrier, the method 300 further includes S350: The network device sends BWP configuration information to the first terminal device. The BWP configuration information is used to configure a BWP of the second carrier, and a start location of the BWP of the second carrier is determined based on the start location of the second carrier. Correspondingly, in S350, the first terminal device receives the BWP configuration information from the network device.

The BWP configuration information may include one or more of start location information of the BWP and bandwidth information of the BWP.

That a start location of the BWP of the second carrier is determined based on the start location of the second carrier means that the start location of the BWP of the second carrier is the same as the start location of the second carrier. Alternatively, the start location of the BWP of the second carrier is after the start location of the second carrier, and before a last RB of the second carrier.

It should be understood that a bandwidth of the BWP of the second carrier is determined by the bandwidth of the second carrier. For example, the bandwidth of the BWP of the second carrier may be equal to the bandwidth of the second carrier, or the bandwidth of the BWP of the second carrier may be lower than the bandwidth of the second carrier. This is not limited in this embodiment of this application.

It should be further understood that the spectrum resource of the BWP of the second carrier is a part or all of the spectrum resource of the second carrier. If the bandwidth of the BWP of the second carrier is equal to the bandwidth of the second carrier, the spectrum resource of the BWP of the second carrier is the spectrum resource of the second carrier. If the bandwidth of the BWP of the second carrier is lower than the bandwidth of the second carrier, the spectrum resource of the BWP of the second carrier is a part of the spectrum resource of the second carrier.

The network device may include the carrier configuration information and the BWP configuration information in a same piece of signaling and send the same piece of signaling to the first terminal device, or may include the carrier configuration information and the BWP configuration information in different signaling and send the different signaling to the first terminal device. This is not limited in this embodiment of this application.

Correspondingly, in S350, after receiving the BWP configuration information from the network device, the first terminal device may determine the BWP of the second carrier based on the BWP configuration information, and can communicate with the network device by using the BWP of the second carrier. It should be understood that, in this embodiment of this application, the first terminal device may determine the BWP of the second carrier based on the BWP configuration information. This indicates that the first terminal device has a capability of parsing the BWP configuration information, and has a capability of determining the BWP of the second carrier based on the BWP configuration information. For example, when the bandwidth of the first cell is higher than 100 MHZ, an index of a start RB of the BWP indicated by the start location information included in the BWP configuration information may be larger than 275. In this case, the first terminal device still has the capability of determining the BWP of the second carrier based on the BWP configuration information.

Optionally, the method 300 may further include S360 to S380.

S360: The network device sends second carrier configuration information. Correspondingly, in S360, the first terminal device receives the second carrier configuration information.

Figure 7:
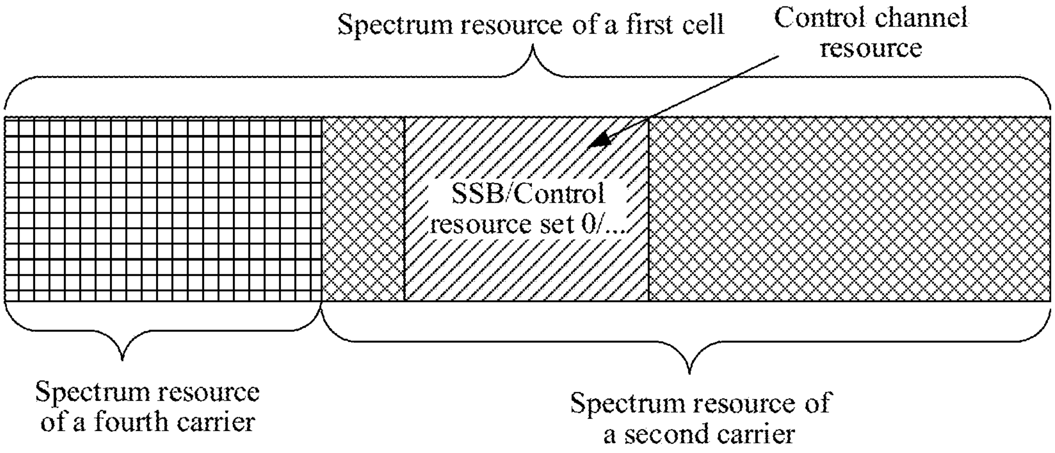
FIG. 7 is a schematic diagram of a relationship between a spectrum resource of a fourth carrier and a spectrum resource of a second carrier.

The second carrier configuration information is used to add a fourth carrier for the first terminal device in the first cell. The fourth carrier and the second carrier include completely different spectrum resources. It may be understood that, when the fourth carrier and the second carrier include completely different spectrum resources, the fourth carrier does not include the control channel resource. FIG. 7 shows an example of a second carrier and a fourth carrier. As shown in FIG. 7, the spectrum resource of the fourth carrier may be a spectrum resource, other than the spectrum resource of the second carrier, in the spectrum resource of the first cell.

For example, the second carrier configuration information is carried in SCell addition signaling.

Optionally, before S360, the method 300 further includes S370: The first terminal device reports second capability information in the first cell. The second capability information indicates that the first terminal device supports carrier aggregation.

Specifically, in S370, the first terminal device reports the second capability information to the network device by using the first carrier. Alternatively, after changing from the first carrier to the second carrier based on the first carrier configuration information, the first terminal device reports the second capability information to the network device by using the second carrier. Optionally, if the first terminal device reports the second capability information to the network device by using the first carrier, the first terminal device can include the first capability information and the second capability information in a same piece of signaling.

Correspondingly, after receiving the second capability information from the first terminal device, the network device sends the second carrier configuration information to the first terminal device based on the second capability information. In other words, after the network device determines, based on the second capability information, that the first terminal device supports the carrier aggregation, the network device sends the second carrier configuration information to the first terminal device.

Optionally, in S360, after the first terminal device receives the second configuration information from the network device, if the first terminal device supports the carrier aggregation, the first terminal device communicates with the network device in the first cell by using the second carrier and the fourth carrier.

Specifically, when the first terminal device communicates with the network device in the first cell by using the second carrier and the fourth carrier, the second carrier is used as a PCell carrier, and the fourth carrier is used as an SCell carrier.

Optionally, the method 300 further includes: The first terminal device uses synchronization with the second carrier to keep synchronization with the fourth carrier.

In this embodiment of this application, when the first terminal device supports the carrier aggregation, the network device may add an SCell carrier for the terminal device. In this way, carrier aggregation configuration of two carriers is implemented in one cell, resource utilization and throughput of the first cell is improved, and the experience of the first terminal device is improved.

Optionally, the method 300 further includes S380: The network device performs space division pairing between a second terminal device that meets a pairing condition and a first terminal device. The second terminal device uses a third carrier in the first cell. The third carrier and the second carrier share the control channel resource, and include a same spectrum resource.

That the third carrier and the second carrier include a same spectrum resource means that the second carrier and the third carrier include the completely same spectrum resource, or the second carrier and the third carrier include a partially same spectrum resource. It should be understood that the partially same spectrum resource included in the second carrier and the third carrier is a spectrum resource other than the control channel resource.

For example, in S380, the network device uses a cell bandwidth integrated scheduling method, determines a spatial correlation between the terminal devices in real time based on uplink measurement, determines the spatial correlation between the different terminal devices on a frequency band, and for the terminal devices that use different carriers, performs multi-stream space division pairing at an RB or resource block group (RBG) level.

Figure 8:
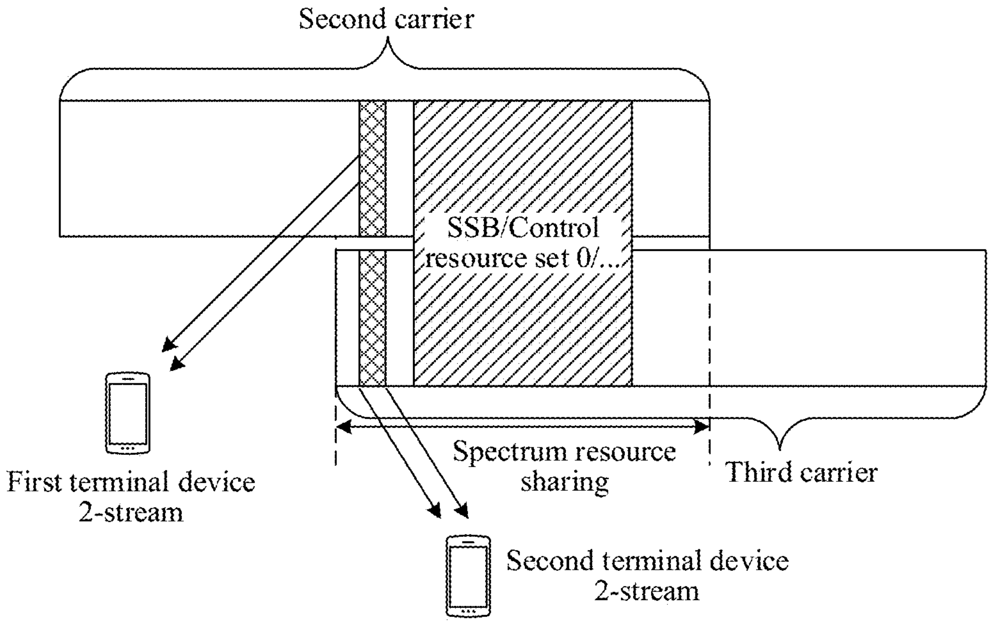
FIG. 8 is a schematic diagram in which different terminal devices share a spectrum resource.

In FIG. 8, an example in which a second carrier and a third carrier include a partially same spectrum resource is used to describe a method in which a network device performs space division pairing between a first terminal device and a second terminal device. As shown in FIG. 8, the network device configures the second carrier for the first terminal device, and configures the third carrier for the second terminal device. If the network device determines, based on the uplink measurement, that the first terminal device and the second terminal device meet the pairing condition, the network device performs 2-stream space division pairing between the first terminal device and the second terminal device. The first terminal device and the second terminal device share, in a space division manner, the spectrum resource on the overlapping part of the second carrier and the third carrier.

In embodiments of this application, the network device can perform the space division pairing between the terminal devices that use different carriers, to increase a system capacity.

The foregoing describes in detail the resource configuration method according to this application, and the following describes a communication apparatus provided in this application.

Figure 9:
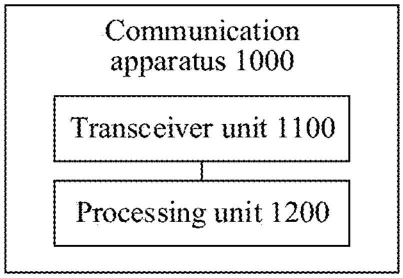
FIG. 9 is a schematic block diagram of a communication apparatus according to this application.

FIG. 9 is a schematic block diagram of a communication apparatus 1000 according to this application. As shown in FIG. 9, the communication apparatus 1000 includes a transceiver unit 1100 and a processing unit 1200.

A processing unit 1200 is configured to access a first cell by using a control channel resource of a first carrier. The transceiver unit 1100 is configured to receive first carrier configuration information. The first carrier configuration information is used to change a carrier of a terminal device from the first carrier to a second carrier in the first cell. The first carrier and the second carrier share the control channel resource, and include different spectrum resources.

Optionally, in an embodiment, the processing unit 1200 is further configured to change from the first carrier to the second carrier based on the first carrier configuration information.

Optionally, in an embodiment, the transceiver unit 1100 is further configured to report first capability information in the first cell. The first capability information indicates that the terminal device supports the change from the first carrier to the second carrier.

Optionally, in an embodiment, the transceiver unit 1100 is further configured to receive BWP configuration information. The BWP configuration information is used to configure a BWP of a second carrier, and a start location of the BWP is determined based on a start location of the second carrier.

In an implementation, the communication apparatus 1000 may be a terminal device in the method embodiments. In this implementation, the transceiver unit 1100 may be a transceiver. The processing unit 1200 may be a processing apparatus.

In another implementation, the communication apparatus 1000 may be a chip or an integrated circuit installed in the terminal device. In this implementation, the transceiver unit 1100 may be a communication interface or an interface circuit. For example, the transceiver unit 1100 is an input/output interface or an input/output circuit, and the processing unit 1200 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 1000 performs an operation and/or processing performed by the terminal device in the method embodiments. Optionally, the processing apparatus may include only the processor, and the memory configured to store the computer program is located outside the processing apparatus. The processor is connected to the memory through a circuit/wire, to read and execute the computer program stored in the memory. For another example, the processing apparatus may be a chip or an integrated circuit.

Figure 10:
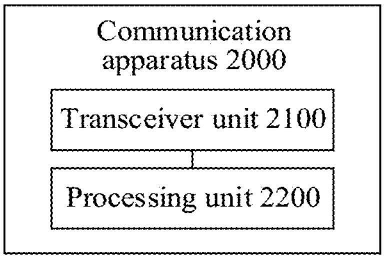
FIG. 10 is a schematic block diagram of a communication apparatus according to this application.

FIG. 10 is a schematic block diagram of a communication apparatus 2000 according to this application. As shown in FIG. 10, the communication apparatus 2000 includes a transceiver unit 2100 and a processing unit 2200.

A processing unit 2200 is configured to determine first carrier configuration information. The first carrier configuration information is used to change a carrier of a first terminal device from a first carrier to a second carrier in a first cell. The first terminal device is a terminal device that accesses the first cell by using a control channel resource of the first carrier. The first carrier and the second carrier share the control channel resource, and include different spectrum resources. The transceiver unit 2100 is configured to send the first carrier configuration information to the first terminal device.

Optionally, in an embodiment, the transceiver unit 2100 is further configured to receive first capability information. The first capability information indicates that the first terminal device supports the change from the first carrier to the second carrier.

Optionally, in another embodiment, the transceiver unit 2100 is further configured to send BWP configuration information to the first terminal device. The BWP configuration information is used to configure a BWP of the second carrier, and a start location of the BWP is determined based on a start location of the second carrier.

Optionally, in another embodiment, the processing unit 2200 is configured to determine the carrier configuration information based on one or more of the following: a frequency band interference value of the first cell, a physical resource block utilization rate of the first cell, a quantity of terminal devices in a radio resource control connected mode in the first cell, and a service type of the terminal device in the radio resource control connected mode.

Optionally, in another embodiment, the processing unit 2200 is further configured to perform space division pairing between a second terminal device that meets a pairing condition and the first terminal device. The second terminal device uses a third carrier in the first cell. The third carrier and the second carrier share the control channel resource, and include a same spectrum resource.

In an implementation, the communication apparatus 2000 may be a network device in the method embodiments. In this implementation, the transceiver unit 2100 may be a transceiver. The processing unit 2200 may be a processing apparatus.

In another implementation, the communication apparatus 2000 may be a chip or an integrated circuit installed in the network device. In this implementation, the transceiver unit 2100 may be a communication interface or an interface circuit. For example, the transceiver unit 2100 is an input/output interface or an input/output circuit, and the processing unit 2200 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 2000 performs an operation and/or processing performed by the network device in the method embodiments. Optionally, the processing apparatus may include only the processor, and the memory configured to store the computer program is located outside the processing apparatus. The processor is connected to the memory through a circuit/wire, to read and execute the computer program stored in the memory. For another example, the processing apparatus may be a chip or an integrated circuit.

Figure 11:
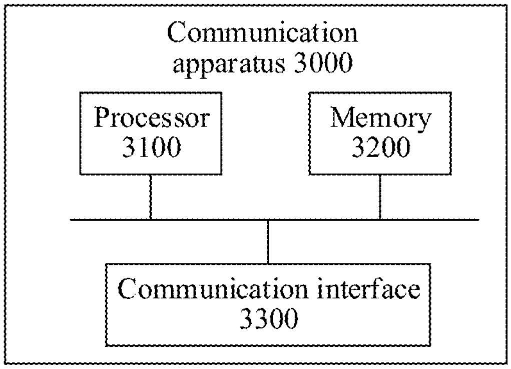
FIG. 11 is a schematic diagram of a structure of a communication apparatus according to this application.

FIG. 11 is a schematic diagram of a structure of a communication apparatus 3000 according to this application. As shown in FIG. 11, the communication apparatus 3000 includes one or more processors 3100, one or more memories 3200, and one or more communication interfaces 3300. The processor 3100 is configured to control the communication interface 3300 to send or receive a signal. The memory 3200 is configured to store a computer program, and the processor 3100 is configured to invoke and run the computer program from the memory 3200, so that a procedure and/or an operation performed by the terminal device in the method embodiments of this application are/is performed.

For example, the processor 3100 may have a function of the processing unit 1200 shown in FIG. 9, and the communication interface 3300 may have a function of the transceiver unit 1100 shown in FIG. 9. Specifically, the processor 3100 may be configured to perform processing or an operation performed inside the terminal device in the method embodiments of this application. The communication interface 3300 is configured to perform sending and/or receiving actions performed by the terminal device in the method embodiments of this application.

In an implementation, the communication apparatus 3000 may be the terminal device in the method embodiments. In this implementation, the communication interface 3300 may be a transceiver. The transceiver may include a receiver and a transmitter.

Optionally, the processor 3100 may be a baseband apparatus, and the communication interface 3300 may be a radio frequency apparatus.

In another implementation, the communication apparatus 3000 may be a chip installed in the terminal device. In this implementation, the communication interface 3300 may be an interface circuit or an input/output interface.

Figure 12:
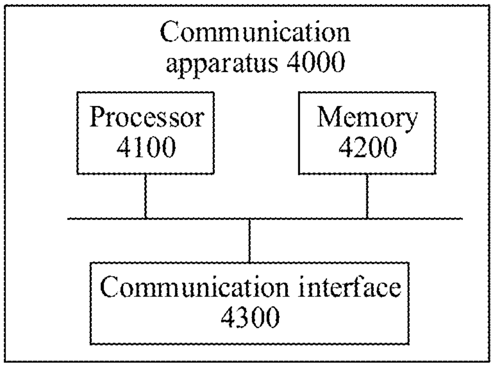
FIG. 12 is a schematic diagram of a structure of a communication apparatus according to this application.

FIG. 12 is a schematic diagram of a structure of a communication apparatus 4000 according to this application. As shown in FIG. 12, the communication apparatus 4000 includes one or more processors 4100, one or more memories 4200, and one or more communication interfaces 4300. The processor 4100 is configured to control the communication interface 4300 to send or receive a signal. The memory 4200 is configured to store a computer program, and the processor 4100 is configured to invoke and run the computer program from the memory 4200, so that a procedure and/or an operation performed by the network device in the method embodiments of this application are/is performed.

For example, the processor 4100 may have a function of the processing unit 2200 shown in FIG. 10, and the communication interface 4300 may have a function of the transceiver unit 2100 shown in FIG. 10. Specifically, the processor 4100 may be configured to perform processing or an operation performed inside the network device in the method embodiments of this application. The communication interface 4300 is configured to perform sending and/or receiving actions performed by the network device in the method embodiments of this application.

In an implementation, the communication apparatus 4000 may be the network device in the method embodiments. In this implementation, the communication interface 4300 may be a transceiver. The transceiver may include a receiver and a transmitter.

Optionally, the processor 4100 may be a baseband apparatus, and the communication interface 4300 may be a radio frequency apparatus.

In another implementation, the communication apparatus 4000 may be a chip installed in the network device. In this implementation, the communication interface 4300 may be an interface circuit or an input/output interface.

Optionally, the processor and the memory in the foregoing apparatus embodiments may be units physically independent of each other, or the memory and the processor may be integrated. This is not limited in this specification.

In addition, this application further provides a computer-readable storage medium. The computer-readable storage medium stores computer instructions. When the computer instructions are run on a computer, an operation and/or a procedure performed by a terminal device in the method embodiments of this application are/is performed.

This application further provides a computer-readable storage medium. The computer-readable storage medium stores computer instructions. When the computer instructions run on a computer, an operation and/or a procedure performed by a network device in the method embodiments of this application are/is performed.

This application further provides a computer program product, and the computer program product includes computer program code or instructions. When the computer program code or the instructions are run on a computer, an operation and/or a procedure performed by a terminal device in the method embodiments of this application are/is performed.

This application further provides a computer program product. The computer program product includes computer program code or instructions. When the computer program code or the instructions are run on a computer, an operation and/or a procedure performed by a network device in the method embodiments of this application are/is performed.

In addition, this application further provides a chip. The chip includes a processor. A memory configured to store a computer program is disposed independently of the chip, and a processor is configured to execute the computer program stored in the memory, so that an operation and/or processing performed by a terminal device in any method embodiment are/is performed.

The chip may further include a communication interface. The communication interface may be an input/output interface, or may be an interface circuit, or the like. Further, the chip may further include the memory.

This application further provides a chip. The chip includes a processor. A memory configured to store a computer program is disposed independently of the chip, and a processor is configured to execute the computer program stored in the memory, so that an operation and/or processing performed by a network device in any method embodiment are/is performed.

The chip may further include a communication interface. The communication interface may be an input/output interface, or may be an interface circuit, or the like. Further, the chip may further include the memory.

In addition, this application further provides a communication system, including a terminal device and a network device in embodiments of this application.

A processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It can be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. By way of example but not limitation, many forms of RAMs are usable, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other ways. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

The term "and/or" in this application describes only an association relationship for describing associated objects and represents that three relationships may exist. For example, A and/or B may represent the following three cases: Only A exists, both A and B exist, and only B exists. A, B, and C may all be singular or plural. This is not limited.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A carrier configuration method, performed by a network device, comprising:

determining first carrier configuration information used to change a first terminal device from a first carrier to a second carrier in a first cell, wherein the first terminal device accesses the first cell by using a control channel resource of the first carrier, and the first carrier and the second carrier share the control channel resource, and comprise different spectrum resources;

performing space division pairing between a second terminal device that meets a pairing condition and the first terminal device, wherein the second terminal device uses a third carrier in the first cell, and the third carrier and the second carrier share the control channel resource, and comprise a same spectrum resource; and sending the first carrier configuration information to the first terminal device.

2. The method according to claim 1, further comprising:

receiving first capability information in the first cell that indicates that the first terminal device supports the change from the first carrier to the second carrier.

3. The method according to claim 1, further comprising:

sending bandwidth part BWP configuration information to the first terminal device, wherein the BWP configuration information is used to configure a BWP of the second carrier, and a start location of the BWP is determined based on a start location of the second carrier.

4. The method according to claim 1, wherein determining, by the network device, first carrier configuration information comprises:

determining the first carrier configuration information based on one or more of: a frequency band interference value of the first cell, a physical resource block utilization rate of the first cell, a quantity of terminal devices in a radio resource control connected mode in the first cell, or a service type of the terminal device in the radio resource control connected mode.

5. An apparatus, comprising:
a processor, and a memory configured to store a computer program, wherein the processor is configured to invoke and run the computer program stored in the memory, wherein the computer program instructs the processor to:
determine first carrier configuration information used to change a first terminal device from a first carrier to a second carrier in a first cell, wherein the first terminal device accesses the first cell by using a control channel resource of the first carrier, and the first carrier and the second carrier share the control channel resource, and comprise different spectrum resources;
perform space division pairing between a second terminal device that meets a pairing condition and the first terminal device, wherein the second terminal device uses a third carrier-in the first cell, and the third carrier and the second carrier share the control channel resource, and comprise a same spectrum resource; and
send the first carrier configuration information to the first terminal device.

6. The apparatus according to claim 5, wherein the computer program further instructs the processor to:
receive first capability information in the first cell that indicates that the first terminal device supports the change from the first carrier to the second carrier.

7. The apparatus according to claim 5, wherein the computer program further instructs the processor to:
send bandwidth part BWP configuration information to the first terminal device, wherein the BWP configuration information is used to configure a BWP of the second carrier, and a start location of the BWP is determined based on a start location of the second carrier.

8. The apparatus according to claim 5, wherein determining first carrier configuration information comprises:
determining the first carrier configuration information based on one or more of: a frequency band interference value of the first cell, a physical resource block utilization rate of the first cell, a quantity of terminal devices in a radio resource control connected mode in the first cell, or a service type of the terminal device in the radio resource control connected mode.

9. A non-transitory computer-readable storage medium, comprising:
computer instructions that, when executed by a processor, cause the processor to
determine first carrier configuration information used to change a first terminal device from a first carrier to a second carrier in a first cell, wherein the first terminal device accesses the first cell by using a control channel resource of the first carrier, and the first carrier and the second carrier share the control channel resource, and comprise different spectrum resources;
perform space division pairing between a second terminal device that meets a pairing condition and the first terminal device, wherein the second terminal device uses a third carrier-in the first cell, and the third carrier and the second carrier share the control channel resource, and comprise a same spectrum resource; and
send the first carrier configuration information to the first terminal device.

10. The computer-readable storage medium according to claim 9, wherein the computer instructions further instructs the processor to
receive first capability information in the first cell that indicates that the first terminal device supports the change from the first carrier to the second carrier.

11. The computer-readable storage medium according to claim 9, wherein the computer instructions further instructs the processor to
send bandwidth part BWP configuration information to the first terminal device, wherein the BWP configuration information is used to configure a BWP of the second carrier, and a start location of the BWP is determined based on a start location of the second carrier.

12. The computer-readable storage medium according to claim 9, wherein determining, by the network device, first carrier configuration information comprises:
determining the first carrier configuration information based on one or more of: a frequency band interference value of the first cell, a physical resource block utilization rate of the first cell, a quantity of terminal devices in a radio resource control connected mode in the first cell, or a service type of the terminal device in the radio resource control connected mode.

* * * * *